No. 880,533. PATENTED MAR. 3, 1908.
J. S. HOYT.
POTATO HARVESTER.
APPLICATION FILED NOV. 17, 1906.
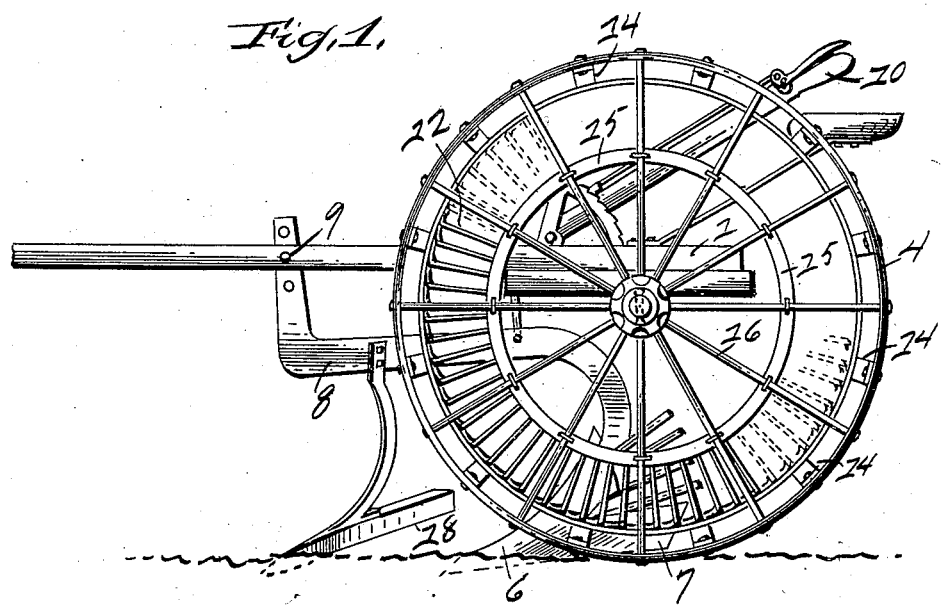
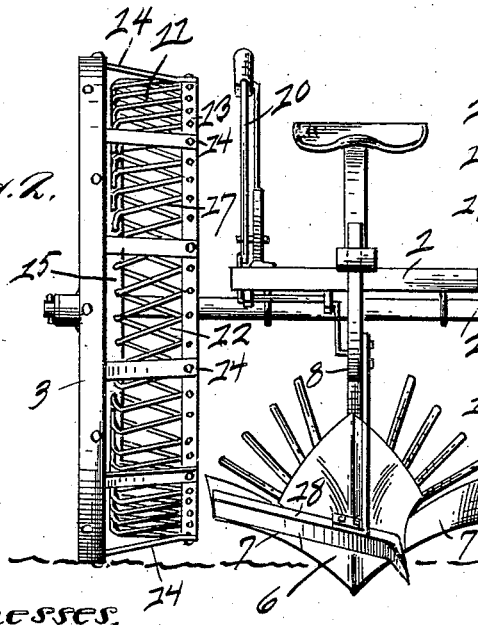

UNITED STATES PATENT OFFICE.

JOEL S. HOYT, OF BANNISTER, MICHIGAN.

POTATO-HARVESTER.

No. 880,533.  Specification of Letters Patent.  Patented March 3, 1908.

Application filed November 17, 1906. Serial No. 343,793.

*To all whom it may concern:*

Be it known that I, JOEL S. HOYT, of Bannister, county of Gratiot, and State of Michigan, have invented certain new and useful Improvements in Potato-Harvesters; and I do hereby declare that the following is a full, clear, and exact description thereof, which will enable others skilled in the art to which it appertains to make and use the same, reference being had to the accompanying drawings, and to the figures of reference marked thereon, which form part of this specification.

This invention has reference to agricultural implements and more particularly to implements for harvesting potatoes; and it has for its object to provide an apparatus of this character which shall be simple in construction, comprising few parts, which is not liable to get out of order, and which can be manufactured and sold at a low cost.

In carrying out my invention I employ a wheeled carriage upon which is adjustably supported a double mold-board plow, with sifters of novel form carried by the wheel on each side of the plow and rotatable therewith, and adapted to receive the mixed soil and potatoes and separate the one from the other, the soil falling through the sifters, the potatoes being discharged from the sifters into the furrow behind the plow. I further provide novel means for turning or deflecting the potato vines or tops to one side beneath one of the wheels of the carriage to be covered by the soil sifted through the wheel, and thereby preventing such tops from being deposited upon the potatoes.

The invention comprises the novel combination, arrangement and details of construction hereinafter shown, described and claimed.

In the accompanying drawings illustrative of my invention Figure 1 is a side elevation of my improved harvester; Fig. 2 is a front elevation of the same; and Fig. 3 is a sectional detail through one of the wheels of the carriage and the sifter carried thereby.

Referring to the details, 1 is the harvester platform supported upon an axle 2, the wheels 3 and 4 carrying the sifter members being mounted at the ends of the axle.

6 indicates a double mold-board plow having the extended side wings 7 adapted to direct the mixed soil and potatoes into the sifter members to be described.

The beam 8 of the plow is adjustably hung from the carriage body being pivoted to the tongue of the carriage at 9 and being raised and lowered by a lever 10 in any preferred manner. The sifter members 11 which I employ consist of angularly bent rods 12 spaced apart and having their ends secured respectively to a band 13 held rigidly to the wheel rim by braces 14, and a ring 15 considerably smaller than the wheel rim and secured in any suitable manner to the spokes 16 of the wheel. The portions 17 of the bent rod 12 are inclined, as plainly shown in Fig. 2, for the purpose of facilitating the entry of the soil and potatoes into the sifter and when the potatoes have been separated from the soil by the rotation of the sifter members it is apparent that the portions 17 of the rod 16 will incline in a downward direction as shown in Fig. 3, the potatoes being as a consequence discharged from the sifter into the furrow behind the plow. Arranged immediately forward of the plow, being preferably adjustably supported from the plow beam, is a member 18 disposed at an inclination to the direction in which the plow operates and having a sharpened end disposed at one side of the plow point, the other end being carried over in an oblique direction so as to be adjacent to the wheel, the result of this arrangement being to force the potato tops beneath the wheel to be covered by the dirt sifted through.

From the fore-going the operation of my invention will be apparent.

Having described my invention, what I claim and desire to secure by Letters Patent, is:—

1. In a potato digger, the wheeled carriage and double mold-board plow, the rings connected to the spokes of the wheels of the carriage, the brackets connected to the rims of the wheels and projecting inwardly, the rings connected to said brackets and the rods connecting the adjacent rings, as set forth.

2. A potato digger comprising the wheeled carriage and double mold board plow, the rings arranged upon opposite sides of the plow, the brackets for connecting said rings to the rims of the wheels, rings of smaller diameter connected to the spokes of the wheels, and spaced bent rods connecting the said rings, for the purpose specified.

In testimony, that I claim the foregoing as my own I affix my signature, in presence of two witnesses.

JOEL S. HOYT.

Witnesses:
CARL H. KELLER,
M. A. TRACY.